United States Patent

[11] 3,564,191

| [72] | Inventors | Anne E. Elzer;<br>Johan N. Dommering, Emmasingel,<br>Eindhoven, Netherlands |
|---|---|---|
| [21] | Appl. No. | 590,620 |
| [22] | Filed | Oct. 31, 1966 |
| [45] | Patented | Feb. 16, 1971 |
| [73] | Assignee | By mesne assignments, to U.S. Philips<br>Corporation<br>New York, N.Y. |
| [32] | Priority | Nov. 10, 1965 |
| [33] | | Netherlands |
| [31] | | 6514562 |

[54] DEVICE FOR RESISTANCE PERCUSSIVE WELDING COMPRISING MEANS FOR SEPARATING TWO WORKPIECES AND THEN CONTACTING THEM AGAIN
10 Claims, 5 Drawing Figs.

[52] U.S. Cl. ................................................. 219/95,
219/113
[51] Int. Cl. ................................................. B23k 9/22
[50] Field of Search........................................ 219/95, 96,
97, 98, 99, 100, 113; 320/1; 310/14; 335/255

[56] References Cited
UNITED STATES PATENTS

| 3,022,400 | 2/1962 | Ahlefeldt | 335/255X |
| 3,141,171 | 7/1964 | Doyle et al. | 335/255X |
| 3,325,622 | 6/1967 | Cordner | 219/95 |
| 3,337,709 | 8/1967 | Bugher | 219/69 |
| 3,458,769 | 7/1969 | Stampfli | 335/255X |
| 1,327,814 | 1/1920 | Fortescue | 219/95 |
| 1,451,558 | 4/1923 | Wagner | 219/95 |
| 2,434,814 | 1/1948 | Schneider et al. | 219/95 |

*Primary Examiner*—J. V. Truhe
*Assistant Examiner*—L. A. Schutzman
*Attorney*—Frank R. Trifari

ABSTRACT: A resistance percussive welding device utilizes an electromagnet for separating the workpieces and subsequently bringing them back into contact. The electromagnet is supplied with a current that first flows in one direction and then in the opposite direction during the welding period.

INVENTORS
ANNE E. ELZER
JOHAN N. DOMMERING
BY
AGENT

DEVICE FOR RESISTANCE PERCUSSIVE WELDING COMPRISING MEANS FOR SEPARATING TWO WORKPIECES AND THEN CONTACTING THEM AGAIN

The present invention relates to a device for resistance percussive welding of workpieces. In general, this type of welding device includes means for separating two workpieces, which are to be welded together and which are in electric and mechanical contact with one another, after an electric current has flowed through the contact place and then contacting them again.

A device of this type is known from British Pat. specification 160,768. The known device shows a complicated structure employing a large number of relays which successively are either energized or deenergized. The energization or deenergization is introduced by the falling movement of a block. The total duration of the welding process is determined by the falling time of the block and is at least one tenth of a second.

In addition to the drawback of the complicated structure, the known device suffers from the following drawbacks: the arc discharge which occurs when the workpieces are separated from one another is poorly reproducible, a comparatively large amount of electrical energy is required and the weld often is not very strong. The cause of these drawbacks principally results from the long duration of the welding process.

It is an object of the invention to avoid the drawbacks of the known device. This is reached by minimizing the total welding time. Total welding time is to be understood to mean herein the time interval between the instant at which the electric current starts flowing through the contact place of the workpieces placed on one another and the instant at which the workpieces which are contacted again are welded together.

The total welding time may be split up into three parts:

1. the pretime, that is the time during which the current flows while the workpieces are still in contact:
2. the arc time, that is the time during which the arc discharge occurs between the workpieces separated from one another,
3. the aftertime, that is the time during which current flows through the contact place after the workpieces are in contact again with one another.

Both upon the pretime and on the arc time the requirement is imposed that it must be very small. The duration of the aftertime is not so important; it may be negligibly small.

According to the invention the means comprise an electromagnetic device through which a current flows which produces an electromagnetic force which controls the movement of the workpieces relative to one another and which current changes sign during the welding process.

The invention is based on the recognition of the fact that a short reproducible welding time produces a rigid reproducible weld.

According to a further feature the current through the electromagnetic device is derived from the diagonal voltage of a bridge, one pair of oppositely located branches of which comprises coils and the other pair comprises capacitors.

According to a further feature, the bridge is supplied from a charging capacitor via a controlled active element connected between the charging capacitor and the bridge. The control circuit of said active element is coupled to the control circuit of a further controlled active element which is included in the circuit producing the electric current through the contact place.

According to a further aspect of the invention, the current through the electromagnetic device is derived from a parallel combination of two controlled active elements which become conductive one after the other and convey currents which differ in direction and value through an auxiliary coil. These currents produce a voltage which varies its direction and value in accordance with time.

According to a further feature the conductivity of the controlled active element which conveys the largest current is controlled by the arc voltage which occurs when the workpieces are separated from one another.

In order that the invention may be carried into effect, two embodiments thereof will now be described in greater detail, by way of example, with reference to the accompanying drawings, in which.

Figure 1:
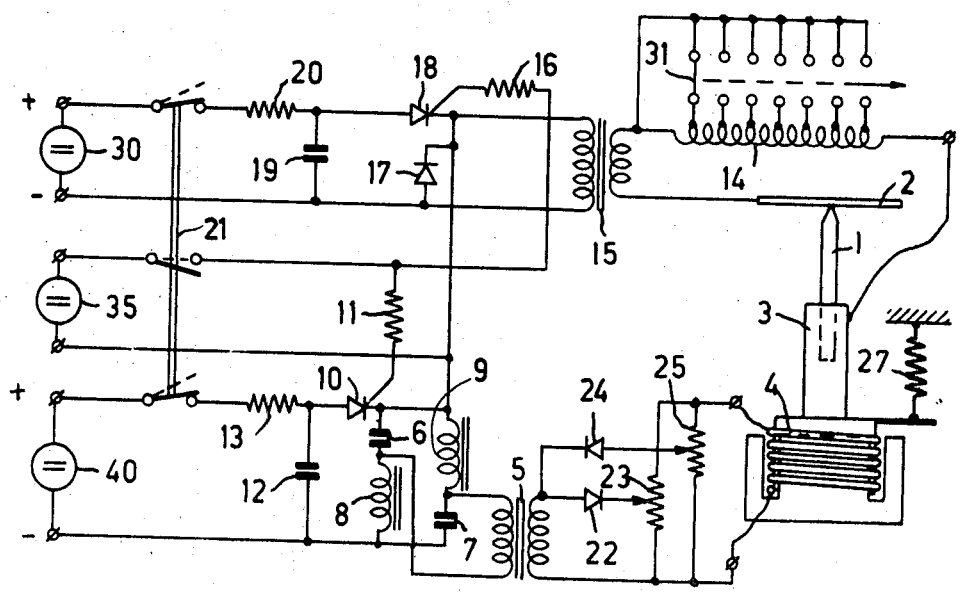
FIG. 1 shows a first circuit diagram of a device according to the invention.

Referring now to FIG. 1, the workpiece 1 is in the form of a wire which has to be welded to a metal plate 2. The wire 1 is clamped in a clamping member 3 which is driven by an electromagnetic force produced by a current through the coil 4. By means of a spring 27, the workpieces 1 and 2 are made to engage one another with a slight pressure.

The coil 4 is connected to the secondary winding of the transformer 5, while the secondary winding of the transformer 15 is connected between the workpieces 1 and 2 through a tapped choke coil 14.

In the solid line position of the switch 21, the capacitors 12 and 19 are charged through the resistors 13 and 20. Said switch is then switched to the broken line position. By means of the resistors 11 and 16 connected to a DC voltage source 35, the control electrodes of the controlled active elements, i.e. controlled rectifiers 10 and 18, receive a positive voltage with respect to the emitting electrodes so that said rectifiers become conductive. Through the transformer 15 and tapped coil 14, a current $i_1$ starts to flow through the workpieces 1 and 2, and through a bridge circuit including capacitors 6 and 7 and coils 8 and 9 and a transformer 5, a current $i_2$ is conveyed through the coil 4, see FIGS. 2a and 2c.

The shape of the coil current $i_2$ may be explained as follows: At the instant the controlled rectifier 10 becomes conductive, the capacitors 6 and 7 are discharged and constitute a small impedance for a sudden voltage pulse. The current will consequently flow principally through the rectifier 10, the capacitor 6, the lower connection of the primary winding of the transformer 5, said transformer winding, and the capacitor 7 to the negative terminal of the capacitor 12.

After some time the capacitors 6 and 7 are charged, but the current through the coils 8 and 9 increases, also because the iron core of said coils becomes saturated. The current in the primary winding of the transformer 5 now changes sign and therewith the current $i_2$ through the coil 4. The magnetic force produced by the coil current $i_2$ consequently also changes sign. This has for its result that the wire 1, which first moves away from the plate 2 as a result of said force, is moved towards the plate when the current reverses.

Figure 2A:
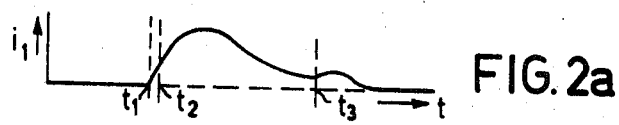
FIG. 2 shows diagrams to explain the operation of the device shown in FIG. 1.
Figure 2B:
Figure 2C:
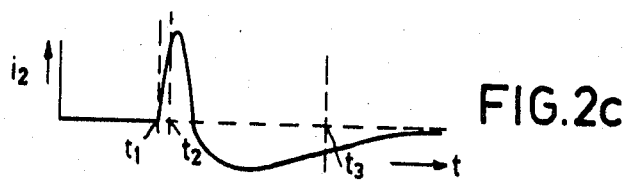

In FIGS. 2a and 2c, the instant $t_1$ is indicated at which the controlled rectifiers 10 and 18 become conductive. At that instant the workpieces 1 and 2 are still in contact with one another.

At the instant $t_2$ the force exerted on the clamping member 3 by the coil 4 exceeds the force exerted by the spring 27 and the contact between the wire 1 and the plate 2 is interrupted. An arc discharge occurs between the two workpieces as a result of the voltage across the secondary winding of the transformer 15. The tip of the wire 1 starts melting. Melting first occurs rapidly but the rate of melting decreases according as the arc current decreases.

Meanwhile the current through the coil 4 has reversed its direction. The direction of movement of the clamping member 3 also reverses and the distance between the workpieces is now rapidly reduced to zero. At the instant $t_3$ the workpiece 1 again contacts the plate 2. The heat developed in the workpiece 2 by the arc current is sufficiently large to weld the workpiece 2 and the wire 1 together.

The current $i_2$ and consequently the magnetic force exerted on the clamping member 3 is limited by the potentiometer 23 and the diode 22 and by the potentiometer 25 and the diode 24, respectively.

The amplitude and shape of the welding current $i_1$ can be controlled by the choke coil 14 in cooperation with the switch 31, by the choice of the value of the capacitor 19 and by the charging voltage of the capacitor 19.

FIG. 2b shows the welding voltage v. as a function of time.

In one embodiment, elements 30, 40 and 35 were direct voltage sources having terminal voltages of 170 v. 300 v. and 10 v. respectively. The resistors 11, 15, 16 and 20 were 50, 100, 50 and 1,000 onm, respectively. The capacitors 6, 7, 12 and 19 were 6, 6, 50 and 400µF, respectively. The coils 8 and 9 had an iron core the inductance of which depended upon the coil current. The controlled rectifiers 10 and 18 were of the type DTY 99; the diodes 17, 22 and 24 were of the type DTY 15 and the transformers 15 and 5 both had a turns ratio of 3:1.

The potentiometers 23 and 25 were 5 and 5 ohm, respectively. The coil 4 had 30 turns of copper having a diameter of 0.5 mm. The plate 2 was of molybdenum and the wire 1 was made copper wrapped wire, that is to say, it consisted of a nickel core and a copper sheath.

The time $t_1-t_2$ was 50µsec. and the time $t_2-t_3$ was 1.5 m.sec.

Figure 3:
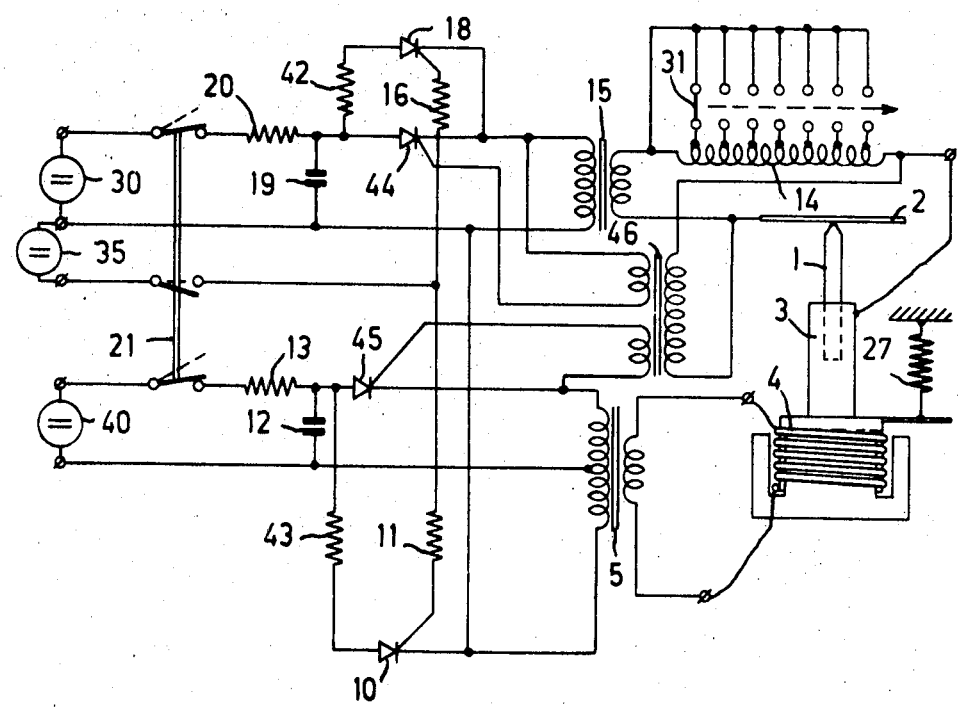
FIG. 3 shows a second circuit diagram of a device according to the invention.

In FIG. 3, which shows a second circuit diagram of a device according to the invention, corresponding elements have been given the same reference numerals as in FIG. 1.

If the switch 21 is switched to the broken-line 2 both of the controlled rectifiers 10 and 18 are made conductive through their commonly connected control electrodes. However, a resistor 43 and 42, respectively, is connected in series with each of the rectifiers. Both the coil current $i_2$ and the welding current $i_1$ are thus kept low. Two other controlled rectifiers 45 and 44 are connected in parallel with controlled rectifiers 10 and 18, respectively. Although control elements 10, 18, 44 and 45 are shown as silicon controlled rectifiers, other controlled active elements may also be used, e.g. thyratrons. At the instant $t_2$ the contact between the parts 1 and 2 to be welded is interrupted and consequently an arc voltage is formed across the welding terminals. This arc voltage is coupled to the control electrodes of controlled rectifiers 44 and 45 by means of transformer 46 and serves as a control voltage therefor to cause said rectifiers to conduct. The rectifier 45 is connected without a series resistance to the upper half of the primary of the transformer 5. Consequently the current in the secondary of said transformer reverses, as does the current through the coil 4. Said coil now moves the wire 1 towards the plate 2 with a great force. Simultaneously, the rectifier 44 connects the capacitor 19 directly to the primary of the transformer 15 so that the arc current strongly increases. As soon as the parts 1 and 2 touch one another again, the welding process is completed.

Of course it is also possible to apply the control voltage to the rectifiers 44 and 45 through an electronic switch.

I claim:

1. A resistance percussive welding device for welding together a pair of workpieces in electric and mechanical contact with one another comprising, a source of electric energy, switch means for coupling said energy source to said workpieces to initiate a welding period by passing a current through said workpieces while the workpieces contact one another, electromagnetic means arranged to separate said workpieces and subsequently bring them back into contact, and means for supplying a current flow in said electromagnet means in one direction during a first portion of said welding period and in the opposite direction during a second portion of said welding period thereby to cause said workpieces to separate and establish an arc discharge therebetween during said first portion of the welding period and subsequently to move said workpiece together again to terminate the welding period.

2. A welding device as claimed in claim 1 wherein said current supply means comprises a bridge circuit having first and second coils in first and second opposed legs of the bridge and first and second capacitors in third and fourth opposed legs of the bridge, and means for coupling the diagonal output terminals of the bridge to the input of said electromagnet means.

3. A welding device as claimed in claim 2 wherein said current supply means further comprises a capacitor coupled to a source of electric energy and a first controlled active element connected between the capacitor and the input terminals of the bridge circuit, and wherein said switch means includes a second controlled active element connected in the current supply circuit of said workpieces, and means for coupling the control electrodes of said first and second controlled active elements together.

4. A welding device as claimed in claim 1 wherein said current supply means comprises first and second controlled rectifiers connected in parallel between a source of electric energy and an auxiliary coil so as to pass currents through said coil in opposite directions, means coupling said electromagnet means to said auxiliary coil, and means for successively triggering said first and second controlled rectifiers into conduction so that a current flows through said auxiliary coil first in one direction and then in the opposite direction.

5. A welding device as claimed in claim 4 further comprising a resistor connected in series with said first controlled rectifier so that currents differing in amplitude are supplied to said auxiliary coil by said first and second controlled rectifiers.

6. A welding device as claimed in claim 4 wherein said triggering means includes means for coupling the arc voltage developed across said workpieces upon separation thereof to the control electrode of said second controlled rectifier.

7. A welding device as claimed in claim 6 further comprising a third controlled rectifier connected between said energy source and said workpieces and means for coupling the arc voltage developed across said workpieces upon separation thereof to the control electrode of said third controlled rectifier to trigger same into conduction.

8. A welding device as claimed in claim 1 wherein said current supply means comprises a bridge circuit having a capacitor in one leg and a saturable reactor in a second leg of the bridge, and means for coupling the input terminals of the bridge circuit to said energy source and the output terminals to the input of said electromagnet means.

9. Apparatus for welding together a pair of workpieces comprising, a source of electric energy, electromagnet means arranged to separate said workpieces and subsequently bring them back into contact independently of the current flow through said workpieces, first and second circuit means for coupling said energy source to said workpieces and to said electromagnet means, respectively, said first and second circuit means including first and second controlled switching elements connected between said energy source and said workpieces and said electromagnet means, respectively, said second circuit means further comprising means for reversing the direction of current flow in said electromagnet means during a welding period.

10. Welding as claimed in claim 19 wherein said first and second circuit means further comprise first and second capacitors connected to said first and second switching elements, respectively, and switch means for coupling said capacitors to said energy source and including means for coupling a trigger voltage to the control electrodes of said first and second switching elements.